(12) United States Patent
Fahimi

(10) Patent No.: US 12,507,671 B1
(45) Date of Patent: Dec. 30, 2025

(54) MULTI-SURFACE CAT TOY BASE WITH STURDY DESIGN FOR ENHANCED STABILITY

(71) Applicant: Shahram Fahimi, North Hills, CA (US)

(72) Inventor: Shahram Fahimi, North Hills, CA (US)

( * ) Notice: Subject to any disclaimer, the term of this patent is extended or adjusted under 35 U.S.C. 154(b) by 0 days.

(21) Appl. No.: 18/918,022

(22) Filed: Oct. 16, 2024

(51) Int. Cl.
A01K 15/02 (2006.01)

(52) U.S. Cl.
CPC .................... *A01K 15/025* (2013.01)

(58) Field of Classification Search
CPC .... A01K 15/02; A01K 15/024; A01K 15/025; A01K 15/0257; A01K 15/027
See application file for complete search history.

(56) References Cited

U.S. PATENT DOCUMENTS

| | | | | |
|---|---|---|---|---|
| 4,712,510 A * | 12/1987 | Tae-Ho | ................ | A01K 15/025 119/708 |
| 4,940,018 A * | 7/1990 | Edling | ................ | A01K 15/025 119/708 |
| 5,148,769 A * | 9/1992 | Zelinger | ............... | A01K 15/025 119/708 |
| 5,322,036 A * | 6/1994 | Merino | .................. | A63H 15/04 446/268 |
| 10,314,291 B2 * | 6/2019 | Chen | ..................... | A01K 15/027 |
| 10,420,324 B2 * | 9/2019 | Wilhelm | ................ | A63H 33/26 |
| 2010/0199925 A1 * | 8/2010 | Lee | ...................... | A01K 15/025 119/707 |
| 2019/0239481 A1 * | 8/2019 | Bentz | .................... | A01K 15/025 |
| 2023/0292712 A1 * | 9/2023 | Wilhelm | .............. | A01K 15/025 119/711 |
| 2025/0064021 A1 * | 2/2025 | Van Wert | ............ | A01K 15/025 |

\* cited by examiner

*Primary Examiner* — Trinh T Nguyen
(74) *Attorney, Agent, or Firm* — Sam Pierce

(57) ABSTRACT

The present invention relates to a cat toy assembly designed to provide interactive play for cats while ensuring stability and durability across multiple surfaces. The invention includes a round base with a diameter of 7.5 inches and a weight of 15 oz, capable of being placed on floors, carpets, or couches without toppling. The assembly features a retractable pole that adjusts in height and includes a silicone-tipped attachment for securing a toy, allowing flexible movement and dynamic bouncing similar to a spring. The invention solves common issues with existing suction cup-based toys, which lose suction over time and are not stable on various surfaces. Additionally, the assembly is easy to disassemble and reassemble, providing convenience for toy replacement and storage. This invention offers a versatile, sturdy solution for cat owners, ensuring long-lasting engagement and satisfaction for both cats and their owners.

1 Claim, 4 Drawing Sheets

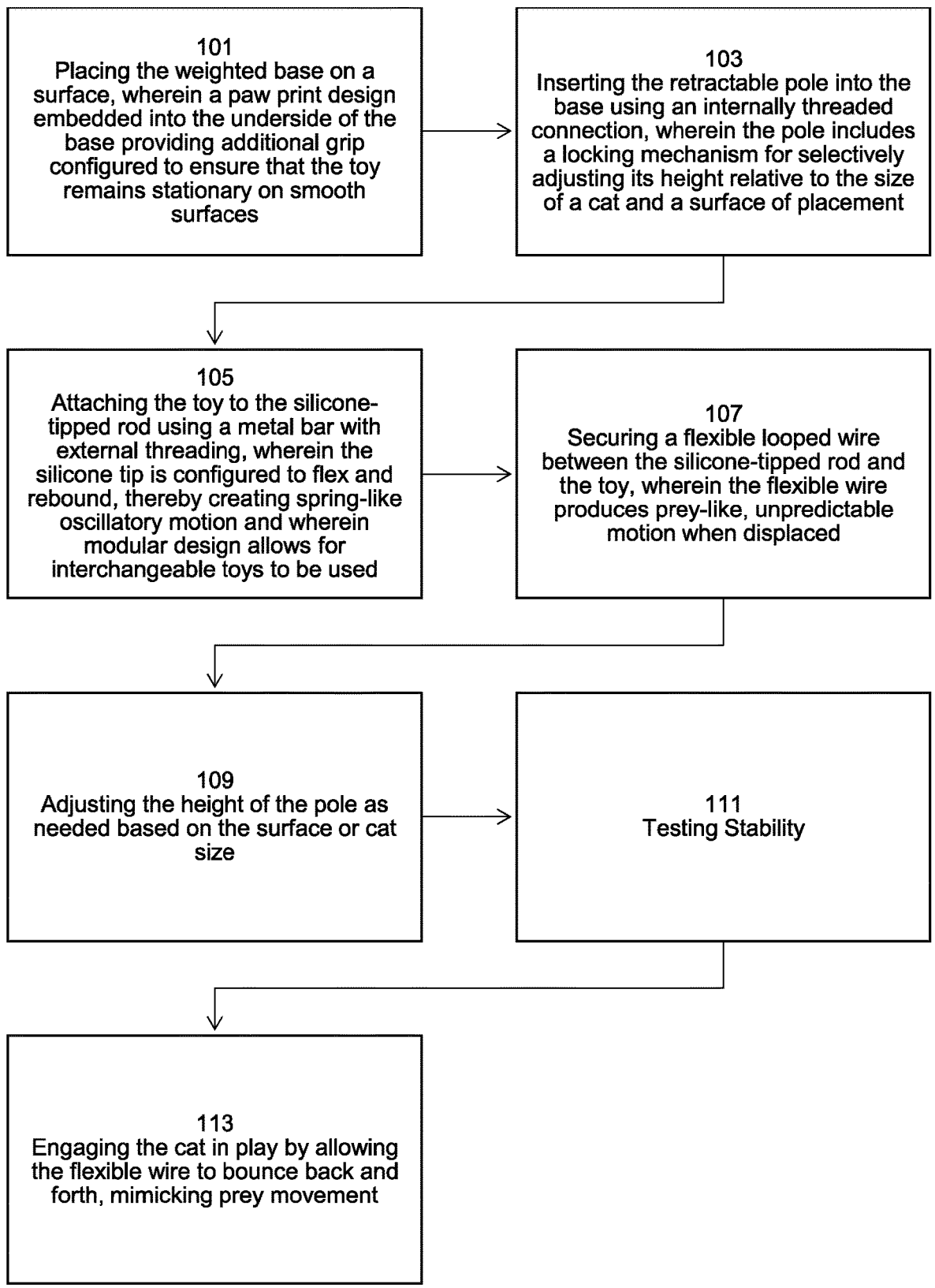

MULTI-SURFACE CAT TOY BASE WITH STURDY DESIGN FOR ENHANCED STABILITY

BACKGROUND OF THE INVENTION

Field of Invention

The present invention pertains to the field of pet toys, specifically targeting the design and function of interactive cat toys that remain stable on a variety of surfaces. This invention addresses the issues of instability and limited usability commonly found in suction-based cat toys. The core of the invention lies in a round, weighted base that is compatible with multiple surfaces such as floors, carpets, couches, and beds.

This innovation ensures the toy remains upright and functional even during rigorous play. The design also incorporates a cat teaser wand that features a flexible wire attached to a silicone-tipped wand, enhancing the interactive experience for the cat by providing bounce-back motion. The sturdy construction, combined with the versatile base, allows the toy to be durable and effective on different surfaces, offering cat owners a reliable and engaging product for their pets.

BRIEF SUMMARY OF THE INVENTION

The present invention provides a cat toy system with a weighted round base designed to remain stable on a variety of surfaces, including floors, carpets, couches, and beds. The 7.5-inch diameter base, weighing 15 ounces, ensures the toy does not topple during play. Attached to the base is a flexible cat teaser wand, featuring a wire that bounces back and forth, mimicking prey movement to engage the cat. The silicone-tipped wand secures the wire and allows easy attachment of various toy accessories. This invention solves the common issue of suction-based toys losing suction and stability over time, offering a durable, multi-surface, and user-friendly solution for cat owners.

BRIEF DESCRIPTION OF THE DRAWINGS

FIG. 6: A flow chart illustrating the assembly and functional process.

DETAILED DESCRIPTION

Figure 1:
FIG. 1: A bottom view of the product showing the paw print design engraved into the base, adding aesthetic appeal and providing extra grip.

The present invention relates to a unique cat toy featuring a stable, weighted base and retractable pole, designed to provide cats with an engaging play experience across multiple surfaces. The invention addresses common problems found in existing cat toys, such as instability and limited surface compatibility. It is aimed at enhancing both durability and usability for cat owners who desire a versatile and interactive toy for their pets.

1. Base Design and Stability

The invention features a circular base with a diameter of 7.5 inches and a weight of 15 ounces, designed to prevent the toy from toppling during use. This weight and size combination ensures that the base remains stable on various surfaces, including carpets, hardwood floors, couches, and beds. The base also includes a paw print on the underside, which serves as both a decorative element and a functional feature. The paw print design improves the grip of the base, helping to prevent it from slipping when placed on smoother surfaces.

The base's design overcomes the limitations of traditional suction-cup-based toys, which tend to lose suction over time and become less effective on different surfaces. The weighted base ensures longevity and functionality across diverse play environments without the need for suction or adhesives.

2. Retractable Pole and Toy Attachment

A key component of the invention is the retractable pole, which allows the toy's height to be adjusted. The pole can be extended or shortened depending on the play area and the preferences of the cat. The adjustable height adds versatility to the toy, making it suitable for different spaces and ensuring that the toy remains interactive for cats of varying sizes and agility levels.

The top of the pole is fitted with a silicone friction control mechanism that securely holds the attached toy in place. This silicone tip prevents the toy from slipping off the pole during vigorous play while allowing for easy replacement when necessary. The assembly process for attaching the toy is simple and user-friendly. The cat owner can screw the toy into the pole's top, ensuring a tight fit that withstands the cat's movements without detaching or loosening.

3. Assembly Process

The toy's assembly is intuitive and requires no additional tools. The user starts by inserting the metal rod into the hollowed-out base and securing it using an internally threaded knob. The knob is designed to match the external threading of the rod, creating a firm connection between the rod and the base. This ensures that the pole remains upright and stable during play. The inclusion of silicone friction control within the knob mechanism adds another layer of security, preventing unwanted rotation or loosening over time.

Once the rod is securely attached to the base, the toy can be easily screwed onto the top of the retractable pole. This modular design allows for interchangeable toys to be used, giving cat owners the option to switch out different types of feather or ball attachments based on their cat's preferences.

4. Versatility and Durability

The invention is built to address common complaints about durability and usability in cat toys. Traditional toys often feature suction cups or light plastic bases that do not hold up to rigorous play or do not work well on different surfaces. The use of a weighted base in this invention not only provides better stability but also enhances the toy's lifespan by using durable materials that can withstand a cat's playful attacks.

Additionally, the flexible wire connected to the toy at the top of the pole acts like a spring, bouncing back and forth as the cat bats at it. This dynamic movement engages the cat more effectively, encouraging longer periods of play. The wire's flexibility adds an element of unpredictability to the toy's movement, which keeps the cat entertained and engaged.

5. Target Audience and Use Case Scenarios

This invention is particularly beneficial for cat owners who live in homes with various types of surfaces. Whether the toy is placed on a couch, bed, or hard floor, the stable base ensures that it won't topple over, even when a cat is playing vigorously with it. The toy's flexible wire and interchangeable attachment options make it suitable for a wide variety of cats, from kittens to older, more sedentary pets. The ability to adjust the height of the pole also makes the toy adaptable for different play environments, such as small apartments or larger homes.

6. Problem Solved by the Invention

The main problem addressed by this invention is the instability and limited usability of current cat toys on the market. Many existing toys rely on suction cups or adhesive materials that fail over time or do not work on all surfaces. These toys often become unusable when they lose suction or when the cat exerts too much force, causing them to topple or detach.

By contrast, this invention's weighted base design ensures that the toy remains stable and functional across a variety of surfaces. It eliminates the need for suction or adhesives, making the toy more versatile and durable. Additionally, the toy's modular design, with its retractable pole and interchangeable attachments, offers a higher level of engagement for the cat and convenience for the owner.

7. Materials and Construction

The materials used in the construction of the invention are chosen for their durability and safety. The base is made from a hard plastic material that can withstand the wear and tear of daily use. The retractable pole is also made from a sturdy, lightweight material that resists bending or breaking under the cat's weight. The silicone components used in the friction control mechanism are non-toxic and safe for pets, ensuring that the toy remains safe even if the cat chews or bites at the attachments.

The looped wire that connects the toy to the pole is flexible yet strong, designed to mimic the natural movements of a bird or other small prey. This wire adds to the toy's longevity by resisting breakage or fraying, even after extended use.

8. Customization and Future Development

One of the key features of this invention is its ability to be customized. The retractable pole allows the toy to be adjusted in height, making it suitable for different types of play and spaces. Additionally, the interchangeable nature of the toy attachments provides cat owners with a variety of options, from feathers to balls, enhancing the toy's replay value.

Future developments could include additional base designs, such as larger or more ornate bases for aesthetic appeal. The retractable pole could also be improved with different materials or designs to make it even more durable or flexible. The invention could also be expanded to include electronic features, such as a motion sensor that activates the toy when the cat approaches, further enhancing its appeal and interactivity.

This invention provides a significant improvement over existing cat toys by offering a stable, durable, and versatile product that can be used on a variety of surfaces. Its unique design, which includes a weighted base, retractable pole, and flexible wire attachment, ensures that it will remain engaging for cats while being easy to use for their owners. The toy's durability and adaptability make it a valuable addition to any cat owner's home, providing hours of entertainment and physical activity for their pets.

DETAILED DESCRIPTION OF FIGURES

FIG. 1: Paw Print on the Bottom of the Product

This figure illustrates a detailed top-down view of the base, highlighting the paw print design embedded into the underside of the product. The paw print serves both a decorative and functional purpose. It provides additional grip to ensure that the toy remains stationary on smooth surfaces such as hardwood or tile. The material used for the paw print is slightly textured, creating friction that prevents sliding.

Figure 2:
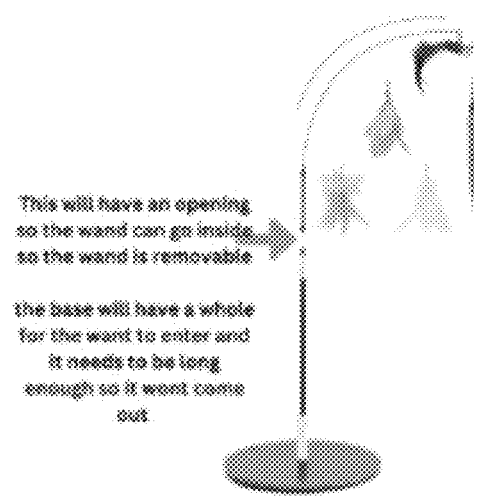
FIG. 2: Illustration of the retractable pole in its fully extended and retracted states, demonstrating flexibility in height adjustment.

FIG. 2: Retractable Pole

The retractable pole is shown extended and retracted in this figure. The design allows for height adjustment depending on the cat's size or the height of the surface where the toy is placed. The pole is constructed from lightweight yet durable material to ensure it can withstand vigorous play. Its extension mechanism employs a locking feature to hold the pole at various lengths, allowing flexibility in play settings.

This figure provides a detailed view of how the toy's attachment is screwed into the base. The assembly process is depicted from a top perspective, showing how the toy's rod screws into the base with ease. The rod connects securely into the base via an internally threaded knob, ensuring stability during play. The simplicity of this design allows cat owners to change or replace toys without the need for additional tools.

Figure 3:
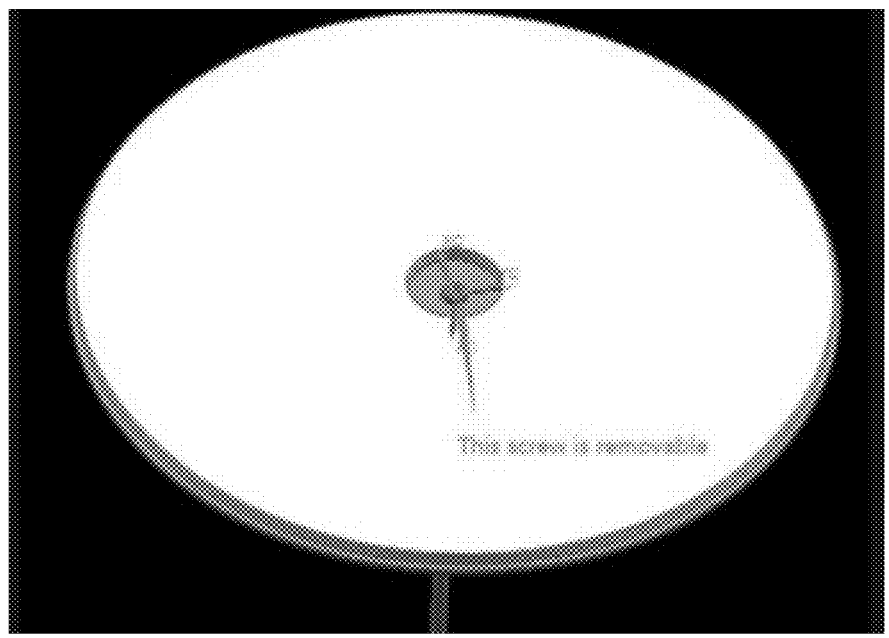
FIG. 3: Bottom view of the fully assembled product, displaying how the base design stabilizes the entire structure on various surfaces.

FIG. 3: Bottom View of the Assembly

This bottom view figure shows how the various components of the base and pole are connected. The focus is on the secure threading between the base and pole, ensuring that the assembly remains tight and stable even during intense play. The paw print on the base can also be seen from this perspective, adding extra grip and aesthetic value. The weight distribution of the base is highlighted to demonstrate how it prevents toppling on uneven surfaces.

Figure 4:
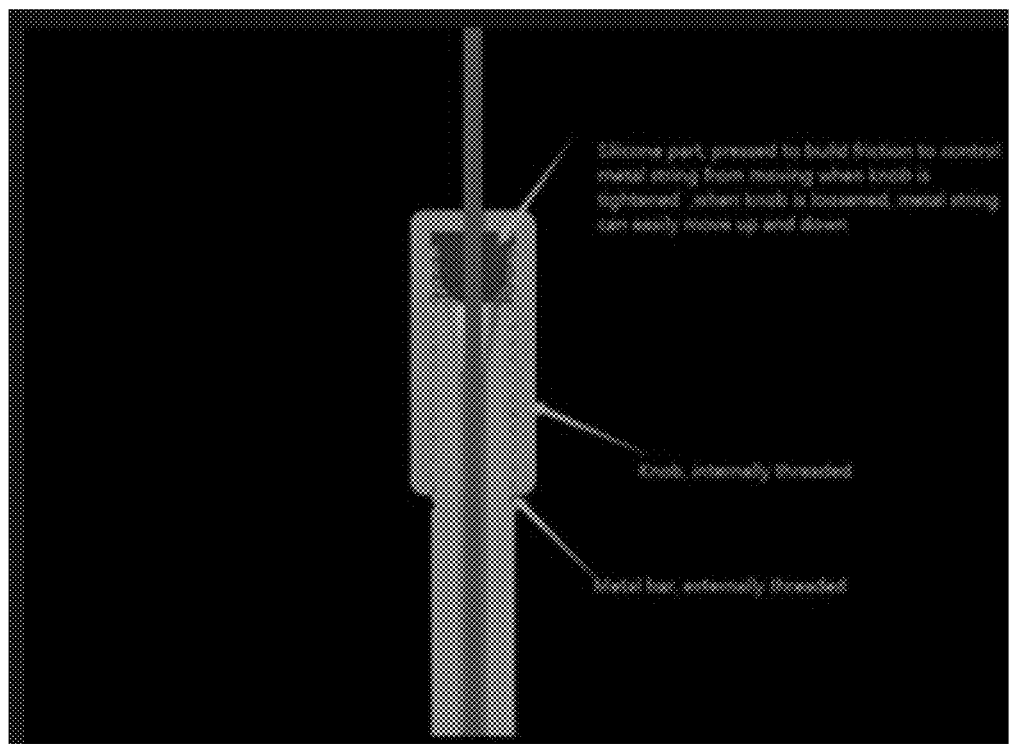
FIG. 4: Detailed depiction of where the toy is inserted into the rod, highlighting the silicone friction control, internally threaded knob, and externally threaded metal bar for secure attachment.

FIG. 4: Anatomy of the Toy Insertion Mechanism

This figure details the section where the toy gets inserted onto the rod, showing its components: a silicone friction control element, an internally threaded knob, and a metal bar with external threading. The silicone friction control helps secure the toy in place while allowing flexibility in movement. The figure emphasizes the durability of the metal bar and the ease of attaching different toy heads for customization.

Figure 5:
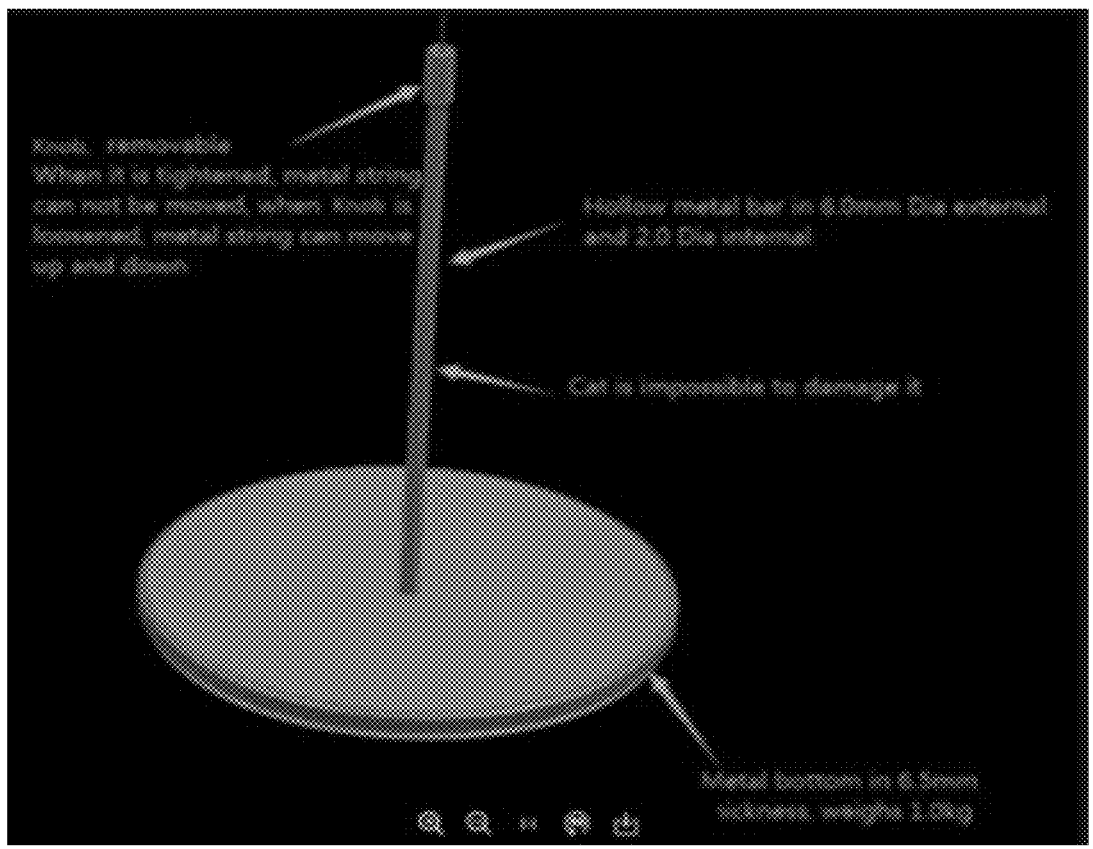
FIG. 5: Complete anatomy of the product, showing the knob, weighted base, hollowed damage-proof rod, and how each component fits together to create a durable, multi-surface toy stand.

FIG. 5: Complete Assembly of the Toy

This figure presents the entire product in its fully assembled form, showcasing all its components: the weighted base, the retractable and hollowed-out damage-proof rod, and the attached toy. The figure emphasizes the robust nature of the product while demonstrating the flexibility and adjustability of the rod and toy attachment. It shows how the product can be placed on various surfaces, maintaining its stability due to its weight distribution and material choices.

FIG. 6: Flowchart of the Product's Functional Process

This figure provides a flowchart depicting the various steps 101-106 involved in using the product, from assembly to play. It begins with the placement of the base on the desired surface, followed by attaching the pole and securing the toy. The flow then details how the product is used during play, focusing on the flexibility and movement of the retractable pole and the attached toy. Finally, it highlights the ease of disassembling the product for storage or replacement of components.

What is claimed is:

1. A method for assembling the cat toy assembly comprising:
   a. A round base having a diameter of approximately 7.5 inches and a weight of approximately 15 oz, configured to be placed on various surfaces, including floors, carpets, and couches, without toppling over during play;
   b. A retractable pole attached to the base, wherein the pole is adjustable in height and is constructed of a durable, flexible material; and
   c. A silicone-tipped attachment mechanism that secures a toy to the top of the pole, designed to allow flexible movement akin to a spring, enabling the toy to bounce back and forth during play;

wherein the method of assembling the cat toy assembly comprises the steps of:
1. Placing the weighted base on a surface, wherein a paw print design embedded into the underside of the base providing additional grip configured to ensure that the toy remains stationary on smooth surfaces;
2. Inserting the retractable pole into the base using an internally threaded connection, wherein the pole includes a locking mechanism for selectively adjusting its height relative to the size of a cat and a surface of placement;
3. Attaching the toy to the silicone-tipped rod using a metal bar with external threading, wherein the silicone tip is configured to flex and rebound, thereby creating spring-like oscillatory motion and wherein modular design allows for interchangeable toys to be used;
4. Securing a flexible looped wire between the silicone-tipped rod and the toy, wherein the flexible wire produces prey-like, unpredictable motion when displaced;
5. Adjusting the height of the pole as needed based on the surface or cat size; and
6. Engaging the cat in play by allowing the flexible wire to bounce back and forth, mimicking prey movement;
a. Placing the weighted base on a surface, wherein a paw print design embedded into the underside of the base providing additional grip configured to ensure that the toy remains stationary on smooth surfaces;
b. Inserting the retractable pole into the base using an internally threaded connection, wherein the pole includes a locking mechanism for selectively adjusting its height relative to the size of a cat and a surface of placement;
c. Attaching the toy to the silicone-tipped rod using a metal bar with external threading, wherein the silicone tip is configured to flex and rebound, thereby creating spring-like oscillatory motion and wherein modular design allows for interchangeable toys to be used;
d. Securing a flexible looped wire between the silicone-tipped rod and the toy, wherein the flexible wire produces prey-like, unpredictable motion when displaced;
e. Adjusting the height of the pole as needed based on the surface or cat size; and
f. Engaging the cat in play by allowing the flexible wire to bounce back and forth, mimicking prey movement.

* * * * *